United States Patent
Hirayama et al.

(10) Patent No.: US 6,316,057 B1
(45) Date of Patent: Nov. 13, 2001

(54) METHOD FOR COATING A SURFACE

(75) Inventors: Martina Hirayama; Walter R. Caseri; Ulrich W. Suter, all of Zürich (CH)

(73) Assignee: Global Surface Aktiengesellschaft, Zurich (CH)

( * ) Notice: Subject to any disclaimer, the term of this patent is extended or adjusted under 35 U.S.C. 154(b) by 0 days.

(21) Appl. No.: 09/423,110

(22) PCT Filed: May 26, 1998

(86) PCT No.: PCT/CH98/00220

§ 371 Date: Oct. 29, 1999

§ 102(e) Date: Oct. 29, 1999

(87) PCT Pub. No.: WO98/53921

PCT Pub. Date: Dec. 3, 1998

(30) Foreign Application Priority Data

May 28, 1997 (CH) .................................................. 1262/97

(51) Int. Cl.$^7$ ................................. B05D 5/00; B05D 5/08
(52) U.S. Cl. .................... 427/400; 427/226; 427/399; 148/246; 148/272; 148/279
(58) Field of Search ..................... 427/301, 302, 427/303, 387, 399, 400, 226; 148/246, 272, 279

(56) References Cited

U.S. PATENT DOCUMENTS

| 4,873,119 | 10/1989 | Akhtar et al. | 427/39 |
|---|---|---|---|
| 5,215,801 | 6/1993 | Wong | 428/76 |
| 5,308,421 | * 5/1994 | Gonczy et al. | 427/226 |
| 5,708,046 | * 1/1998 | Jones et al. | 427/515 |
| 5,789,485 | * 8/1998 | Kobayashi et al. | 427/387 |

FOREIGN PATENT DOCUMENTS

| 1 914 411 | 10/1969 | (DE) . |
|---|---|---|
| 6256659 | 9/1994 | (JP) . |

OTHER PUBLICATIONS

Hydrosilylation Chemistry and Catalysis with cis–PtCl$_2$(PhCH=CH$_2$)$_2$, pp. 1373 to 1381—Organometallics 1988.

Formation and Structure of Self–Assembled Monolayers—Chem. Rev. 1996, pp. 1533 to 1554.

Surface Absorption of Monolayers, Abraham Ulman, Mrs. Bulletin/Jun. 1995, pp. 46 to 51.

Formation of an Ordered Self–Assembled Monolayer . . . , Langmuir 1992, 8, 1615–1618.

Adsorption of Alkanenitriles and Alkanedinitriles on Gold and Copper, Langmuir 1992, 8, 2771–2777.

Adsorption of NPh$_3$, PPh$_3$, AsPh$_3$SbPh$_3$ and BiPh$_3$ on Gold and Copper, Langmuir 1992, 8, 90–94.

Ultrathin Layers of Low and High Molecular Weight Imides on Gold and Copper, Langmuir 1993, 9, 3245–3254.

Formation of Monolayers by the Coadsorption . . . , J. Am. Chem. Soc. 1989, 111, 7155–7164.

Addition of Silicon Hydrides to Olefins—vol. 79—pp. 974–979 (No Date).

Platinum–Catalyzed Hydrosilylation . . . —J. Am. Chem. Soc. 1986, 108, 7228–7231.

Homogeneous Catalyst II.—J. Am. Chem. Soc., Jan. 5, 1965, pp. 16–21.

Homogeneous Catalysts of Hydrosilation by Transition Metals—John Speier, Academic Press, pp. 407–447 (No Date).

Herstellung, Verhalten und katalytische Reaktionen mit cis– und trans–Dichlorobis(stryol)platin(II) . . . (Diss. ETH Nr. 8475) (No Date).

* cited by examiner

*Primary Examiner*—Shrive P. Beck
*Assistant Examiner*—Kirsten A. Crockford
(74) *Attorney, Agent, or Firm*—Herbert Dubno; Jonathan Myers

(57) ABSTRACT

Metal surfaces, metal-oxide surfaces, metal-salt surfaces, silicon-comprising surfaces and/or high-molecular-weight aquoxide-comprising organic surfaces are coated. The coating is carried out with a reagent having a reactive group chosen from Si—H, Sn—H, and Ge—H. The reagent is applied in liquid, pasty, or solid form to the surface that is to be coated. Furthermore, the coating reaction requires the presence of an activator. A platinum metal in form of a compound or in metallic form is used as activator.

11 Claims, No Drawings

METHOD FOR COATING A SURFACE

CROSS REFERENCE TO RELATED APPLICATIONS

This application is a national stage of PCT/CH 98/00220 filed May 28, 1998 and based upon Swiss national application 1262/97 of May 28, 1997 under the International Convention.

FIELD OF THE INVENTION

The present invention relates to a process for the coating of a metal surface, metal-oxide surface, metal-salt surface, silicon surface and high-molecular-weight aquoxide organic surface.

BACKGROUND OF THE INVENTION

Numerous procedures have been established to coat surfaces, such as CVD (Chemical Vapor Deposition), PVD (Physical Vapor Deposition), plasma coating, the Langmuir-Bodgett-Technique and adsorption or reaction from solution. These methods lead to the formation of thin or ultrathin films (including monolayers).

The average thickness of thin and ultrathin films ranges up to several micrometers. For example, self assembled films are well studied, i.e. films which assemble spontaneously from homogeneous solution at surfaces. For example, diphosphates form self-assembled multilayers (Ulman, A.; Chem. Rev. 1996,96,1533 and Ulman, A.; MRS Bulletin 1995,6,46). Self-assembled monolayers form among others, with organosulfur compounds, which typically contain a thiol, disulfide or thioether group (loc.cit). Such organosulfur compounds exhibit a strong affinity to transition metal surfaces. Their coordination to gold, silver, copper, platinum, mercury, iron, gallium arsenide and colloidal gold surfaces has already been studied (loc.cit). Organoselenium compounds, such as organoselenols on gold (Samant, M. G.; Brown, C. A.; Gordon II, J. G.; Langmuir 1992,8,1615), and fatty acids, e.g., n-alkanoic acids on $Al_2O_3$, Ago, Cuo and glass (Ulman, A; Chem. Rev. 1996,96,1533 and Ulman, A.; MRS Bulletin 1995,6,46) also form self-assembled monolayers. The adsorption of alkanenitriles (Steiner, U. B.; Caseri, W. R.; Suter, U. W.; Langmuir 1992,8,2771), phosphines, triphenylamine, triphenylarsine, triphenyistilbine, triphenylbismuthine (Steiner, U. B.; Neuenschwander, P.; Caseri, W. R.; Suter, U. W.; Stucki, F.; Langmuir 1992,8,90), imides (Steiner, U. B.; Caseri, W. R.; Suter, U. W.; Rehahn, M.; Schmitz, L.; Langmuir 1993,9, 3245) and tricosylisocyanide (Bain, C. D.; Eval, J.; Whitesides, G. M.; J.Am.Chem.Soc. 1989,111,7155) is also described. Monolayers with covalent C—Si bonds are obtained on H—Si(111) or H—Si(100) silicon surfaces with the help of peroxides (Ulman,A.; Chem. Rev. 1996,96, 1533). Organosilicon compounds, which typically contain a chlorosilane, alkoxysilane or aminosilane group also form self-assembled monolayers on substrates such as silicon oxide, aluminum oxide, quartz, glass, mica, zinc selenide, germanium oxide, and gold (Ulman, A.; Chem. Rev. 1996, 96,1533 and Ulman, A.; MRS Bulletin 1995,6,46).

OBJECT OF THE INVENTION

The object of the present invention is to provide a process for the coating of surfaces, which allows the preparation of well-adhering thin and/or ultrathin layers (including monolayers) on materials as different as metals, metal-oxides, metal-salts, silicon-comprising materials and high-molecular-weight aquoxide-comprising organic materials.

DESCRIPTION OF THE INVENTION

The invention is based on the discovery, that reagents with Si—H, Sn—H or Ge—H groups form layers on metal surfaces, metal-oxide surfaces, metal-salt surfaces, silicon-comprising surfaces and high-molecular-weight aquoxide-comprising organic surfaces in presence of a platinum metal as activator in the form of a compound or in metallic form. The reagents are solids or liquids, which are applied in bulk or in a medium in liquid, pasty or solid form. The reagents can be applied, for example, as solution, as emulsion, as suspension, as foam or as spray. According to the technical terminology, the elements Ru, Rh, Pd, Os, Ir and Pt are known as platinum metals. Preferred are platinum compounds, including those that are reduced with silanes to platinum(O) or those that already contain platinum(O). In metallic form, the platinum metals are present preferentially as particles of atomic, colloidal or larger dimensions.

Platinum compounds which can be reduced with silanes to Pt(O) or which are already present in the oxidation state O have been described, for example, by Caseri, W. R.; Dissertation, ETH Zürich, 1988. Examples for such platinum compounds are cis-dichlorobis(styrene)platinum(II), trans-dichlorobis(styrene)-platinum(II), platinum(II) chloride, platinum(II) bromide, potassium tetrachloroplatinate(II), platinum(O) divinyltetramethyidisiloxane, Zeise's salt, triphenylphosphineaecetylacetonatochloroplatinum(II), dichloro-$\mu_2$-dichlorobis(styrene)diplatinum(II) or bis (cyclooctadiene)platinum(O).

Transition metal compounds that react with, e.g., Si—H, Sn—H or Ge—H bonds via oxidative addition are known in organometallic chemistry. This reaction is used, e.g. for the hydrosilylation, hydrostannylation and hydrogermylation. The hydrosilylation reaction describes the addition of organic and inorganic silicon hydrides to multiple bonds, e.g. in olefins, acetylenes, ketones, imines, and nitriles (Bogdan, M.; "Comprehensive Handbook on Hydrosilylation", Pergamon Press, Oxford 1992). On the basis of Speier's results (Speier, J. L.; Webster, J. A.; Barnes, G. H., J.Am.Chem.Soc. 1957,79,974; Speier, J. L.; Adv.Organomet.Chem. 1979,17,407) and their own observations of the first examples of oxidative addition reactions of silanes to transition metal compounds, Chalk and Harrod proposed a homogeneously catalyzed mechanism for the hydrosilylation reaction (Chalk, A. J.; Harrod, J. F.; J.Am.Chem.Soc. 1965,87,16). There are also heterogeneously catalyzed hydrosilylation reactions, where the transition metal compound is reduced to a colloid and the resulting colloid is catalytically active. For example, hexachloroplatinic acid is reduced to colloidal platinum, which is catalytically active (Lewis, L. N.; Lewis, N.; J.Am.Chem.Soc. 1986,108,7228). Hydro-stannylation and hydrogermylation reactions describe analogously the addition of their organic and inorganic hydrides to multiple bonds.

The above mentioned references describe reactions with multiple bonds. According to the invention surprisingly it was found that a reaction takes place between the solid phase of the material of the surface to be coated and the reagent, where the desired strongly adhering coating is obtained in the presence of the activator.

In U.S. Pat. No. 5,215,801, a crosslinking reaction of vinyl- and hydride-functionalized silicones is described. This is a classical hydrosilylation reaction with a platinum catalyst. The silicone to be vulcanized is filled with $SiO_2$, which is added among other factors to improve the adhesive properties. A reaction between Si—H groups and the solid phase of the material of the surface to be coated in the presence of an activator is not striven for.

In DE-A 19 14 411 a gas phase reaction or a growth from the gas phase, respectively, is described. Compounds containing, e.g., Si—H are evaporated, i.e., transferred into the gas phase. The reactive gaseous substances are activated with catalysts (e.g. Pt). Subsequently the activated substances must react either with a reagent (e.g., ammonia) or they must be decomposed. Only the reacted or decomposed substance forms the desired layer.

Also, in U.S. Pat. No. 4,873,119 a gas phase reaction is described. Here, the production of amorphous semiconductors originating from compounds with Si—H or Ge—H groups is described. The Si—H or Ge—H compounds are transferred into the gas phase, activated with, e.g., platinum and decomposed by, e.g., glow discharge, heat (incl. pyrolysis) or light (incl. IR, UV) to amorphous semiconductors and deposited on a surface.

An advantage of the present invention to coating procedures such as CVD and PVD is the fact that reagents do not have to be transferred into the gaseous phase but can be applied in liquid, pasty or solid form.

A special advantage of the procedure according to this invention is the variety of different substrates that can be coated. Suitable surfaces to be coated, i.e., substrates, are metals, metal-oxides, metal-salts, alloys (for example steels), silicon compounds (for example silicon wafers or silicate glasses), ceramics (for example silicate ceramics, oxide ceramics, brick, clays, glass ceramics, cermets), rock (for example silicates, quartz, carbonates, nitrates, borates, phosphates, sulfates) and/or artificial stones, for example concrete. Examples for metals, metal-oxides, and metal-salts are Li, Na, Mg, Al, K, Ca, Ti, V, Cr, Mn, Fe, Co, Ni, Cu, Zn, Ge, Rb, Y, Zr, Nb, Mo, Ru, Rh, Pd, Ag, Cd, In, Sn, Cs, Ba, Hf, Ta, W, Re, Os, Ir, Pt, Au, Pb, La, Ce, Nd, and U. Suitable surfaces to be coated are also high-molecular-weight aquoxide-comprising organic compounds, for example wood, cardboard, paper, polysaccharides (for example cellulose or cellulose derivatives), proteins (for example silk, wool or collagen), and/or polyalcohols. Substrates with high-molecular-weight aquoxide-comprising organic compounds can be obtained for example also by surface treatments. Examples are polyethylene or polypropylene modified with corona, plasma, flame or chromic acid treatment, or polyethyleneterepthalate or polyamide pretreated by hydrolytical cleavage. Suitable substrates can also occur in mixed form, for example various silicon oxides, metal-oxides and metal-salts can be present at the same time at the surface of rock. An additional advantage of the procedure according to this invention is, that it often allows the application of a useful coating on naturally formed oxide layers. Flat as well as non-flat surfaces can be coated. The size and/or constitution of the surface to be coated does not limit the procedure according to this invention. Therefore, foils, outer and inner surfaces of porous materials and layers (i.e., also pore walls), interior and exterior surfaces, particles, colloids, and suitable precoated surfaces of, for example, plastics, glasses etc. can be coated according to this invention.

The following definition of oxides bases on Falbe, J.; Regitz, M.; "Römpp Chemie Lexikon", Georg Thieme Verlag, Stuttgart 1991. Oxides are compounds of an element with oxygen, if the oxygen is the electronegative part. The number of oxygen atoms present in the molecule can vary compared with the atoms of the elements. Oxides can also be formed with several different elements (e.g., oxometalates, spinells) and/or with an element of different oxidation numbers (e.g., minimum). Special forms of oxides are hyperoxides, peroxides, suboxides and anhydrides as well as iso- and heteropolyacids. Aquoxides (hydroxides, oxidehydrates, oxonium salts, and oxideaquates) are also counted as part of the oxidic compounds. Besides the stoichiometrically composed oxides, there are also non-stoichiometric compounds with oxygen, in which cluster bonds can be present.

High-molecular-weight aquoxide-comprising organic compounds (molecular weights above about 1,000 g/mol) contain hydroxide-groups, deprotonated hydroxide groups and/or water (hydroxides, oxidehydrates, oxonium salts, and oxideaquates). Thereby the water in form of $H_2O$ molecules and/or in form of $H_3O^+$-groups can stoichiometrically or non-stoichiometrically be bound to the organic compound and/or be freely movably absorbed on the organic compound.

The process according to this invention allows a large variation of the prepared coatings. According to the invention, low-molecular-weight compounds, i.e.; compounds with molecular weights up to about 1,000 g/mol, as well as high-molecular-weight compounds i.e., compounds with molecular weights above about 1,000 g/mol, can be used. Coatings for different applications can be prepared by the use of low-molecular-weight compounds, polymers or copolymers, which can contain additional functional groups.

Examples of reagents that yielded good results are Si—H silanes, polysilazanes, polyhydrosiloxanes and polysiloxanes. For example, Si—H-group-comprising polysilanes, polycarbosilanes or polysilsesquioxanes are also suitable as reagents.

Through the use of reagents with additional reactive groups, further reactions for surface modifications can be performed on the coatings according to this invention.

The coatings according to this invention can be decomposed for various applications. For example, oxide layers can be generated by thermal decomposition of the coatings according to this invention. In addition, the procedure according to this invention can be combined with other surface treatments in order to obtain various decomposition products.

Depending on the selection of the reagent, coatings with various properties can be prepared according to this invention. Accordingly, they can be used in a great variety of technical areas. The coatings can be used for example as protective (UV, corrosion, diffusion, microorganisms, etc.), impregnation, finishing, painting, varnish, decoration, adhesion-promotion, biocompatibility, adhesive, gluing, lubrication, grease, anti-block, anti-adhesive, anti-graffiti, anti-steam-up, separation, and/or releasing layer. In addition, the procedure according to this invention can be combined with other surface treatments in order to obtain the above mentioned results.

The coatings according to this invention are suitable, as mentioned above, for example for the joining of surfaces.

For example, with the help of the coatings according to this invention, surfaces can be coated with reagents containing additional functional groups. By the reaction of such additional functional groups with other substances, surfaces can be, for example, joined.

The coatings according to this invention are suitable for example for the thermal joining with plastics. For example, plastics can be injected directly onto the coatings according to this invention. In addition, the procedure according to this invention can be combined with other surface treatments in order to obtain the above mentioned results.

The coatings according to this invention are suitable, as mentioned above, for example for lubrication. The coatings according to this invention can for example be used directly as lubrication layer and/or as layer that decreases the separation between surface and lubricant. In addition, the procedure according to this invention can be combined with other treatments in order to obtain the above mentioned results.

As mentioned above, for example mechanical systems such as clockwork mechanisms can be lubricated with the help of the coatings according to this invention.

The coatings according to this invention can be used as stabilizer, binder, solidifying agent, reinforcing agent, thickening agent, and/or softening agent. In addition, the procedure according to this invention can be combined with other treatments in order to obtain the above mentioned results.

The coatings according to this invention can, for example, as mentioned above, be used in order to bind suspended particles for the preparation of ceramics. For example, the coherence of extremely small particles can be attained hereby with the help of the coatings according to this invention. Hence, these particles can, for example, be pre-solidified and subsequently sintered.

The coatings according to this invention can be used for the preparation of surfaces of various surface energies. For example, by using suitable reagents, different wettable hydrophilic or hydrophobic layers with different contact angles can be prepared. In addition, the procedure according to this invention can be combined with other treatments in order to obtain the above mentioned results.

The coatings of this invention can be applied, for example, as mentioned above, for the preparation of different wettable hydrophilic or hydrophobic coatings with different contact angles on printing plates or foils. The coatings can be subsequently partially removed or changed. This method is suitable particularly for the preparation of text and graphics. Text and graphics can also be prepared, for example, by applying the coating directly in the print shop. When hydrophobic color-repelling coating materials, such as polysiloxanes, on hydrophilic paint-attracting printing plates or foils such as aluminum or polyester are used, for example water-less planograph is possible. When paint-attracting water-repelling coating materials on water-attracting printing plates or foils such as aluminum or polyester are used, for example wet offset printing is possible. Also, substances can be used for the coatings, which change their properties, for example, under the influence of light and/or temperature reversibly from hydrophilic to hydrophobic and/or reverse (writing). Thus printing plates or foils can be, for example, printed many times. In addition, the process of this invention can be combined with other treatments in order to obtain the abovementioned results.

The coatings according to this invention are also suitable for various areas of electrical engineering, electronics, microtechnology, nanotechnology, biotechnology, and/or medicine, for example insulators, for sensors, for detectors, and/or for "microcontact printing". The coatings according to this invention are also suitable in the area of environmental technology, for example for filters. The coatings according to this invention can, for example be used in areas of the protection and/or renovation of buildings, monuments and/or art. The coatings according to this invention are also suitable for various areas of the automobile industry, for example for the surface modification for the application of paints. In addition, the procedure according to this invention can be combined with other treatments in order to be used in the areas mentioned above.

For performing the procedure according to this invention, the activator can be used for example in bulk, in solution, in emulsion, in suspension, in foam, in spray, or in other systems containing liquid and/or solid phases. As already mentioned, the reagent is applied in liquid, pasty or solid form. Preferentially, first the activator and then the reagent is applied on the surface to be coated or activator and reagent are mixed first and the resulting mixture is applied on the substrate surface. Activator and/or reagent can also be mixed with other substances and then be applied on the substrate surface to be coated.

The following examples illustrate some aspects of the invention. A part of the examples was performed under argon atmosphere. Thereby, it is attempted to exclude the influence of impurities present in the air on the coating reaction according to this invention. However, the procedure according to this invention can also be performed without any problem in the absence of noble gas atmosphere, i.e., in air.

EXAMPLES

Preparation of Surfaces to be Covered with a Coating

Monocrystalline Si(100) wafers polished at one side (Philips Semiconductor AG, Zürich, Switzerland) (18×40× 0.38 mm) were coated with aluminum, titanium, chromium, iron, nickel, copper or gold films. Organic contaminants were removed from the wafers by immersion in toluene UV. The wafers were coated with the films by thermal evaporation at a pressure of ca. $10^{-3}$ Pa using a Balzers MED 010 instrument (Balzers AG, Balzers, Liechtenstein). First, a layer of ca. 6 nm of chromium (99.9%, Balzers AG, Balzers, Liechtenstein) was evaporated on the wafers as an adhesion promoter. Then the chromium layers were coated by evaporation with either ca. 200 nm aluminum (99.89%, Balzers AG, Balzers, Liechtenstein), iron (99.9%, Aldrich, Buchs, Switzerland), copper (99.9%, Balzers AG, Balzers, Liechtenstein), gold (99.99%, Balzers AG, Balzers, Liechtenstein) or ca. 40 nm nickel (99.9%, Aldrich, Buchs, Switzerland), using coating rates of ca. 2 nm/s. In addition, monocrystalline Si(100) wafers were coated directly with ca. 200 nm titanium (99.99%, Aldrich, Buchs, Switzerland) or chromium (99.9%, Balzers AG, Balzers, Liechtenstein), using coating rates of ca. 2 nm/s. After the evaporation process was finished, the vacuum chamber was filled with argon. The wafers were removed from the chamber and immediately used for subsequent treatment. The aluminum, titanium, chromium, iron, nickel, and copper films that had been formed by evaporation were used with their natural oxide layers obtained under the conditions applied here. On the gold films, an oxidation could not be detected under the conditions applied here.

As steel surfaces sheets of hot-rolled, unalloyed building steel (USt 37-2, row, Pestalozzi, Dietikon, Switzerland) (18×40×1 mm) were used. Organic contaminants were removed from the sheets by immersion in toluene UV.

As iron surfaces, iron plates S 235 JRG2 (Surber Metallbau, Zürich, Switzerland) (18×40×1 mm) were used. The plates were wiped with toluene p.a. Subsequently, the plates were immersed in acetic acid in an ultrasonic bath (Bandelin, Sonorex, Super RK 106) for 1 h. Thereafter, the plates were rinsed with water (distilled), acetone and toluene p.a.

As V2A steel surfaces, plates of W 4301 BT (Notz Metall, Biel, Switzerland) (18×40×1 mm) were used. The plates were wiped with toluene p.a. Subsequently, the plates were immersed in aqua regis for 1 min. Thereafter, the plates were rinsed with water (distilled), acetone, and toluene p.a.

As copper surfaces, copper plates Cu-ETP/CuOF (DIN 1787) (Metall Service Menziken, Dübendorf, Switzerland) were used. As aluminum surfaces, aluminum plates AlSi1MgMn (Alusuisse Allega, Niederglatt, Switzerland) were used. The plates (18×40×1 mm) were wiped with toluene p.a. Subsequently the plates were immersed in acetic acid for 10 min. Thereafter, the plates were rinsed with water (distilled), acetone, and toluene p.a.

As silicon surfaces, monocrystalline Si(100) wafers polished at one side (Philips Semiconductor AG, Zürich, Switzerland) (18×40×0.38 mm) were used. Organic contaminants were removed from the wafers by immersion in toluene UV.

As glass surfaces, microscope slides (Menzel, Braunschweig, Germany) (18×40×1 mm) were used. The slides were immersed in NaOH (10 w% in water (distilled)) over night and were rinsed with water (distilled), acetone and toluene p.a.

As ceramic surfaces, plates of aluminum oxide ceramics (96%, A476, Firag, Ebmatingen, Switzerland) (18×40×1 mm) were used. Organic contaminants were removed from the plates by immersion in toluene UV.

As examples of a rock surfaces, stone plates from Pietra di Lecce (Ditta DECOR S.a.S. di MARTINA & Co., Arnesano, Italy), molasse (sandstone from Berne, quarry Ostermundingen, Switzerland), and new red sandstone (quarry Kirschfurt, Miltenberger Industriewerke, Bürgstadt, Germany) were used. Contaminants were removed by rinsing the plates (ca. 5×5×1 cm) with water (distilled).

As examples for concrete surfaces, samples of gravel concrete containing Main gravel, gravel concrete containing Donau gravel, and stone-chippings concrete with chalk gravel and Main sand (Miltenberger Industriewerke, Bürgstadt, Germany) were used. Contaminants were removed by rinsing the samples (ca. 4×4×4 cm) with water (distilled).

As examples for wood surfaces, pieces (smaller than 3×3×0.5 cm) of poplar, maple, and oak (Pastorini, Zürich, Switzerland) were used. As cardboard (ca. 2×2×0.1 cm), standard packaging material was used. The substrates were rinsed with water (distilled) and acetone.

Cellulose plates (ca. 2×2×0.1 cm) (Mikro Technik, Bürgstadt, Germany) were rinsed with toluene p.a.

Cotton (textiles, ca. 3×3 cm) (100%, C&A, Zürich, Switzerland) were rinsed with toluene p.a.

Viscose (textiles, ca. 3×3 cm) (100%, C&A, Zürich, Switzerland) were rinsed with water (distilled), acetone and toluene p.a.

As silk, silk Twill (19001, boiled) and silk Habotai Taffet (11207, boiled) (Bilco-Seide, Zürich, Switzerland) were used. The silks (textiles, ca. 3×3 cm) were rinsed with toluene p.a.

Chemicals and Instruments
Chemicals

Toluene UV 99.5%, UV-quality), toluene (purum), hexane UV (UV-quality), chloroform UV (UV-quality), carbon tetrachloride UV (UV-quality), hydrochloric acid (37%, puriss p.a.), nitric acid (65%, puriss p.a.), dimethyldichlorosilane 99.5%), tributyltinhydride (98%) and hexachloroplatinic acid hydrate (38% Pt) were purchased form Fluka (Buchs, Switzerland).

Chlorodimethylsilane (98%), octadecylsilane (98%) and tributylgermanium-hydride (99%) were purchased from Aldrich (Buchs, Switzerland).

For purification, 1 g octadecylsilane (98%) was dissolved in 20 ml dioxane and treated with 1 ml water and 2 g silica gel. The mixture was stirred at room temperature for 48 h. Thereafter, the mixture was filtered through a paper filter and the liquids were removed with a rotary evaporator at 45° C. under vacuum. Thereafter the substance was distilled at 240° C. and house vacuum.

Diethylmethylsilane, polydimethylsiloxane hydride-terminated (M.W. 28000 g/mol), polydimethylsiloxane trimethylsiloxy-terminated (M.W. 28000 g/mol), polydimethylsiloxane hydride-terminated (M.W. 62000 g/mol), polymethylhydrosiloxane (M.W. 2270 g/mol), (45–50%) methylhydro-(50–55%)phenylmethylsiloxane-copolymer dimethylsiloxy-terminated, (1,2-dimethylsilazane)-(1-methylsilazane)-copolymer and platinum(O)-divinyltetramethyidisiloxane (complex in xylene, 2.1–2.4% platinum, low colour) were purchased from ABCR (Karlsruhe, Germany).

RTV 601, RTV 604 and RTV 625 silicon rubbers were purchased from Wacker (Basel, Switzerland).

Sylgard 184 was purchased form Dow Corning (Wiesbaden, Germany).

Polyester (Mylar A) was purchased from Du Pont de Nemours (Bad Homburg, Germany).

Acetic acid (100%, reinst) and toluene p.a. (puriss p.a.) were purchased form Riedel-de Haäen (Seelze, Germany).

NaOH (platelets PH. Eur. II) were purchased from Siegfried (Zofingen, Switzerland).

Acetone (technical grade) was purchased from Scheller (Zürich, Switzerland).

Cis-dichlorobis(styrene)platinum(II) was prepared as described in the literature (Caseri, W. R.; Dissertation, ETH Zürich, 1988).

Argon (99.99%) was purchased from Pan Gas (Luzern, Switzerland).

Analysis

Infrared spectra at grazing incidence reflection (80°) (IR), X-ray photoelectron spectra using $MgK_\alpha$-radiation (XPS), ellipsometric analyses at $\lambda$=632.8 nm, and/or advancing contact angles of water ($\theta_a$) were measured.

A detailed description of the analytical methods can be found in the publication of Steiner, U. B.; Caseri, W. R.; Suter, U. W.; Rehahn. M.; Schmitz, L.; Langmuir 1993, 9, 3245.

Examples 1–2

160 ml toluene UV were degassed with argon in an ice bath for ca. 15 min. Subsequently 3.8 mg cis-dichlorobis (styrene)platinum(II) were added and stirred in an ice bath under argon atmosphere for ca. 20 min. The substrate plate with a gold film was then immersed in the resulting solution or suspension. Subsequently a compound with Si—H groups was added. The ice bath was then removed and the reaction mixture was slightly stirred under argon atmosphere for 1 h. Thereafter, the substrate plate was removed, rinsed with 30 ml toluene UV and dried in an argon stream. The resulting samples were stored in brown snap-cap vessels (Merck, Dietikon, Switzerland) under argon until they were subjected to analyses.

Example 1

The compound with Si—H groups was 17.8 $\mu$l chlorodimethylsilane.

Example 2

The compound with Si—H groups was 23.4 $\mu$l diethylmethylsilane.

Examples 3–38

160 ml toluene UV were degassed with argon at room temperature for ca. 15 min. Subsequently 3.8 mg cis-dichlorobis(styrene)platinum(II) were added and stirred at room temperature under argon atmosphere for ca. 10 min. The substrate plate was then immersed in the resulting solution or suspension. Subsequently a compound with Si—H, Sn—H or Ge—H groups was added. Then the reaction mixture was slightly stirred at room temperature under argon atmosphere for 1 h. Thereafter, the substrate plate was removed, rinsed with 30 ml toluene UV and dried in an argon stream. The resulting samples were stored under argon until they were subjected to analyses.

Examples 3–20

The compound with Si—H groups was 4.6 ml polydimethylsiloxane hydride-terminated (M.W. 28000 g/mol).

Example 3

The substrate plate was covered with a gold film.

Example 4

The substrate plate was covered with a copper film.

Example 5

The substrate plate was covered with an aluminum film.

Example 6

The substrate plate was covered with a chromium film.

Example 7

The substrate plate was covered with a titanium film.

Example 8

The substrate plate was covered with an iron film.

Example 9

The substrate plate was a copper plate.

Example 10

The substrate plate was an aluminum plate.

Example 11

The substrate plate was an iron plate.

Example 12

The substrate plate was a V2A steel plate.

Example 13

The substrate plate was a glass plate.

Example 14

The substrate plate was a ceramics plate.

Example 15

The substrate plate was a stone plate from Pietra di Lecce.

Example 16

The substrate plate was a stone plate from of molasse.

Example 17

The substrate plate was a stone plate from new red sandstone.

Example 18

The substrate plate was a plate of gravel concrete containing Main gravel.

Example 19

The substrate plate was a plate of gravel concrete containing Donau gravel.

Example 20

The substrate plate was a plate of stone-chippings concrete with chalk gravel and Main sand.

Examples 21–26

The compound with Si—H groups was 0.37 ml polymethylhydrosiloxane.

Example 21

The substrate plate was covered with a gold film.

Example 22

The substrate plate was covered with a copper film.

Example 23

The substrate plate was covered with an aluminum film.

Example 24

The substrate plate was covered with an iron film.

Example 25

The substrate plate was covered with a nickel film.

Example 26

The substrate plate was a silicon wafer.

Example 27

The substrate plate was covered with a copper film. The compound with Si—H groups was 0.19 ml (45–50%)methylhydro-(50-55%)phenylmethyl-siloxane copolymer dimethylsiloxy-terminated.

Examples 28–29

The compound with Si—H groups was 0.05 ml (1,2-dimetylsilazane)-(1-methylsilazane)-copolymer.

Example 28

The substrate plate was covered with a copper film.

Example 29

The substrate plate was a silicon wafer.

Examples 30–33

The compound with Si—H groups was 1.02 ml polydimethylsiloxane hydride-terminated (M.W. 62000 g/mol).

Example 30

The substrate plate was covered with a gold film.

Example 31

The substrate plate was covered with a copper film.

Example 32

The substrate plate was covered with an aluminum film.

Example 33

The substrate plate was covered with an iron film.

Example 34

The compound with Si—H groups was 45 mg octadecylsilane. The substrate plate was covered with a gold film.

Examples 35–36

The compound with Sn—H groups was 0.04 ml tributyltinhydride.

Example 35

The substrate plate was covered with a gold film.

Example 36

The substrate plate was covered with a copper film.

Examples 37–38

The compound with Ge—H groups was 0.04 ml tributylgermaniumhydride.

Example 37

The substrate plate was covered with a gold film.

Example 38

The substrate plate was covered with a copper film.

Examples 39–46

Cis-dichlorobis(styrene)platinum(II) was stirred in toluene at room temperature for ca. 10 min. Then the substrate plate was immersed in the solution or suspension. Subsequently polydimethylsiloxane hydride-terminated (M.W. 28000 g/mol) was added. Then the reaction mixture was slightly stirred at room temperature for the period indicated below. Thereafter, the substrate plate was removed, rinsed with 30 ml toluene and dried in the open atmosphere. The resulting samples were stored in brown snap-cap vessels until they were subjected to analyses.

Examples 39–41

The concentration of the activator was 50 $\mu$M, that of the compound with Si—H groups 1 mM. The reaction mixture was slightly stirred for 1 h.

Example 39

The substrate plate was covered with a gold film.

Example 40

The substrate plate was covered with a copper film.

Example 41

The substrate plate was a copper plate.

Examples 42–44

The substrate plate was a copper plate. The reaction mixture was slightly stirred for 1 h.

Example 42

The concentration of the activator was 50 $\mu$M, that of the compound with Si—H groups 0.1 mM.

Example 43

The concentration of the activator was 50 $\mu$M, that of the compound with Si—H groups 0.01 mM.

Example 44

The concentration of the activator was 5 $\mu$M, that of the compound with Si—H groups 0.1 mM.

Examples 45–46

The substrate plate was a copper plate. The concentration of the activator was 50 $\mu$M, that of the compound with Si—H groups 0.1 mM.

Example 45

The reaction mixture was slightly stirred for 30 min.

Example 46

The reaction mixture was slightly stirred for 10 min.

Examples 47–55

Cis-dichlorobis(styrene)platinum(II) was stirred in toluene at room temperature for ca. 10 min. Subsequently polydimethylsiloxane hydride-terminated (M.W. 28000 g/mol) was added. The reaction mixture was then applied onto the substrate plate at room temperature. Thereafter, the substrate plate was rinsed with 30 ml toluene and dried in the open atmosphere. The resulting samples were stored in brown snap-cap vessels until they were subjected to analyses.

Examples 47–49

The concentration of the activator was 50 $\mu$M, that of the compound with Si—H groups 1 mM. The reaction mixture was brushed on the substrate plate with a cotton-wool ball.

Example 47

The substrate plate was covered with a gold film.

Example 48

The substrate plate was a steel plate.

Example 49

The substrate plate was a copper plate.

Examples 50–52

The substrate plate was a copper plate. The reaction mixture was added as drops on the substrate plate with a pipette.

Example 50

The concentration of the activator was 50 $\mu$M, that of the compound with Si—H groups 0.1 mM.

Example 51

5 mg activator, 1 ml toluene and 1 ml compound with Si—H groups were used.

Example 52

5 mg activator and 1 ml compound with Si—H groups were used. The reaction was performed in bulk, i.e. in absence of toluene.

Examples 53–55

The concentration of the activator was 50 $\mu$M, that of the compound with Si—H groups 1 mM. The reaction mixture was sprayed on the substrate plate with an atomizer.

Example 53

The substrate plate was covered with a gold film.

Example 54

The substrate plate was a steel plate.

Example 55

The substrate plate was a copper plate.

Examples 56–59

3.8 mg cis-dichlorobis(styrene)platinum(II) were stirred in 160 ml toluene p.a. at room temperature for ca. 10 min. Subsequently 0.46 ml polydimethyl-siloxane hydride-terminated (M.W. 28000 g/mol) were added. After the period indicated below, the copper plate was immersed in the solution or suspension and the reaction mixture was slightly stirred for 1 h. Thereafter, the copper plate was removed, rinsed with 30 ml toluene p.a. and dried in the open atmosphere. The resulting samples were stored in brown snap-cap vessels until they were subjected to analyses.

Example 56

Immersed after 1 h.

Example 57

Immersed after 6 h.

Example 58

Immersed after 1 week.

Example 59

Immersed after 2 weeks.

Example 60

160 ml toluene UV were degassed with argon for ca. 15 min at room temperature. Subsequently 3.8 mg cis-dichlorobis(styrene)platinum(II) were added and stirred under argon at room temperature for ca. 10 min. The substrate plate covered with a copper film was then immersed in the solution or suspension. Subsequently, 17.8 $\mu$l chlorodimethylsilane were added and slightly stirred for 10 min under argon at room temperature. Then, 193 $\mu$l dimethyldichlorosilane were added and slightly stirred under argon at room temperature for 50 min. Thereafter, the substrate plate was removed, rinsed with 30 ml toluene UV and dried in an argon stream. The resulting samples were stored in brown snap-cap vessels under argon until they were subjected to analyses.

Examples 61–67

3.8 mg cis-dichlorobis(styrene)platinum(II) were stirred in 160 ml toluene p.a. at room temperature for ca. 10 min. The substrate plate was then immersed in the resulting solution or suspension. Subsequently 0.37 ml polymethylhydrosiloxane were added. Then the reaction mixture was slightly stirred at room temperature for 1 h. Thereafter, the substrate plate was removed, rinsed with 30 ml toluene p.a. and dried in an argon stream. The resulting samples were stored in brown snap-cap vessels until they were subjected to analyses.

Examples 61–64

On coated substrate plates, layers of RTV 601, RTV 604, and RTV 625 were applied.

Example 61

The substrate plates were covered with copper films.

Example 62

The substrate plates were covered with aluminum films.

Example 63

The substrate plates were copper plates.

Example 64

The substrate plates were aluminum plates.

Example 65

On coated glass plates, layers of Sylgard 184 were applied.

Examples 66–67

Layers of RTV 601 were applied between two coated substrate plates.

Example 66

The substrate plates were two copper plates.

Example 67

The substrate plates were two aluminum plates.

Example 68

Aluminum films of ca. 10 nm thickness were evaporated onto polyester foil, which was then immersed in a mixture of cis-dichlorobis(styrene)platinum(II) (50 $\mu$M) and polydimethylsiloxane hydride-terminated (M.W. 28000 g/mol) (0.1 mM) in toluene p.a. for 1 h. Thereafter the substrate was removed, rinsed with toluene p.a. and dried in an argon stream. The obtained coated surface was then structured with a laser beam. The structured surface was then glued on an aluminum plate and used as a printing plate for water-less planography.

Examples 69–72

160 ml toluene UV were degassed with argon at room temperature for ca. 15 min. Subsequently the activator was added and stirred under argon at room temperature for ca. 10 min. Then, the substrate plate was immersed in the solution or suspension. Subsequently 0.46 ml polydimethylsiloxane hydride-terminated (M.W. 28000 g/mol) were added. Then, the reaction mixture was slightly stirred for 1 h under argon at room temperature. Thereafter, the substrate plate was removed, rinsed with 30 ml toluene UV and dried in an argon stream. The resulting samples were stored under argon in brown snap-cap vessels until they were subjected to analyses.

Examples 69–71

The activator was 0.05 ml platinum(O)-divinyltetramethyldisiloxane.

Example 69

The substrate plate was covered with a gold film.

Example 70

The substrate plate was covered with a copper film.

Example 71

The substrate plate was covered with an aluminum film.

Example 72

The activator was 6 mg hexachloroplatinic acid hydrate. The substrate plate was covered with a gold film.

Examples 73–81

Cis-dichlorobis(styrene)platinum(II) was stirred in toluene p.a. at room temperature for ca. 10 min. Then, the substrate was immersed in the solution or suspension. Subsequently polydimethylsiloxane hydride-terminated (M.W. 28000 g/mol) was added. The concentration of the activator was 50 $\mu$M, that of the compound with Si—H groups 0.1 mM. Then the reaction mixture was slightly stirred at room temperature for 1 h. Thereafter, the substrate was removed, rinsed with toluene p.a. and dried in the open atmosphere. The resulting samples were stored in brown snap-cap vessels until they were subjected to analyses.

Example 73

The substrate was a piece of poplar wood.

Example 74

The substrate was a piece of maple wood.

Example 75

The substrate was a piece of oak wood.

Example 76

The substrate was cardboard.

Example 77

The substrate was a cellulose plate.

Example 78

The substrate was cotton.

Example 79

The substrate was viscose.

Example 80

The substrate was silk of silk-Twill.

Example 81

The substrate was silk of silk Habotai Taffet.

All experiments as described in the examples 1–81 were also performed in the absence of activator. The sum of the experiments showed that in the absence of activator, the compounds with Si—H, Sn—H or Ge—H bonds do not or only negligibly bind to the surfaces. Blank experiments with pure solvent or with a solution or suspension containing solely activator did also not yield coatings such as obtained in presence of the respective compounds with Si—H, Sn—H or Ge—H groups.

In all experiments described in the examples 1–81, the formation of a layer containing Si, Sn or Ge was observed in presence of activator.

The coated substrates obtained according to the examples 1–81 were immersed in a solvent for the compounds with Si—H, Sn—H, or Ge—H groups for half a day and thereafter rinsed well. Either toluene UV, toluene p.a., hexane UV, chloroform UV or carbon tetrachloride UV were used as solvents. The sum of the experiments showed that the Si—, Sn— or Ge-containing coating was present after rinsing.

Experiments in presence of cis-dichlorobis(styrene)platinum(II) with a Si—containing compound without Si—H groups were performed on gold films with dimethyldichlorosilane and polydimethylsiloxane trimethylsiloxy-terminated. The sum of the results showed that the Si-containing compound without Si—H groups did not or negligible bind to the surface.

Valuation of the examples

Example 1 yielded a layer of ca. 6 nm thickness and an advancing contact angle of water of about 108°. The IR spectra and XPS measurements corresponded to those of oligomers and/or polymers with $OSi(CH_3)_2$-units. An experiment with distilled chlorodimethylsilane lead to comparable results as the corresponding experiment with non-distilled chlorodimethylsilane.

Example 2 yielded a layer of ca. 3 nm thickness and an advancing contact angle of water of about 90°. The IR spectra and XPS measurements corresponded to those of oligomers and/or polymers with $OSi(CH_2CH_3)_2$-and/or $OSi(CH_2CH_3)(CH_3)$-units. An experiment with distilled diethylmethylsilane lead to comparable results as the corresponding experiment with non-distilled diethylmethylsilane.

Examples 3–8 yielded layers of ca. 2–5 nm thickness and advancing contact angles of water of about 108° to 115°. The IR spectra and XPS measurements corresponded to those of polydimethylsiloxane.

Examples 9–14 yielded layers with advancing contact angles of water of about 105° to 115°.

Examples 15–20 yielded layers with advancing contact angles of water of about 105° to 130°.

Examples 21–26 yielded layers of ca. 5–8 nm thickness and advancing contact angles of water of about 80° to 100°. The IR spectra and XPS measurements corresponded to those of polymethylhydrosiloxane. The IR spectra showed that not all Si—H groups reacted under the conditions applied here. Since silicon surfaces cannot be studied routinely with IR spectroscopy at grazing incidence reflection, example 26 could not be investigated with IR spectroscopy.

For the experiment without activator, the formation of films was observed in the case of gold films exposed to polymethylhydrosiloxane. The polymer film was removed completely upon immersion in chloroform UV for half a day.

Example 27 yielded a layer of ca. 3 nm thickness and an advancing contact angle of water of about 100°. The IR spectra and XPS measurements corresponded to those of a methylhydro-phenylmethylsiloxane-copolymer without Si—H stretching vibrations.

Examples 28–29 yielded layers of ca. 2–5 nm thickness and advancing contact angles of water of about 85–95°. The IR spectra and XPS measurements corresponded to those of a (1,2-dimethylsilazane)-(1-methylsilazane)-copolymer. The IR spectra of example 28 showed that not all Si—H groups reacted under the applied conditions. Example 29 could not be investigated with IR spectroscopy, analogous to example 26.

Examples 30–33 yielded layers of ca. 2–5 nm thickness and advancing contact angles of water of about 105° to 115°. The IR spectra and XPS measurements corresponded to those of polydimethylsiloxane.

Example 34 yielded a layer of ca. 2 nm thickness and an advancing contact angle of water of about 106°. The IR spectra and XPS measurements corresponded to those of a monolayer with saturated hydrocarbons of a chain length of 18 carbon atoms and Si—O groups. Experiments with purified and non-purified octadecylsilane yielded comparable results.

Examples 35–36 yielded layers of ca. 4 nm thickness and advancing contact angles of water of about 90°. The IR spectra in the region of 3000–2800 $cm^{-1}$ corresponded to those of tributyltinhydride. The Sn—H stretching vibration at 1810 $cm^{-1}$ could not be observed anymore.

Examples 37–38 yielded layers of ca. 1–2 nm thickness and advancing contact angles of water of about 70°–85°. The IR spectra in the region of 3000–2800 $cm^{-1}$ corresponded to those of tributylgermaniumhydride. The Ge—H stretching vibrations at 2006 $cm^{-1}$ could not be observed anymore.

The IR spectra and XPS measurements for the examples 39–40, 47–48 and 53–54 corresponded to those of polydimethylsiloxane.

Examples 41–46 yielded layers with advancing contact angles of water of about 105° to 110°.

Examples 47–55 yielded layers with advancing contact angles of water of about 100 to 110°.

Examples 56–59 yielded layers with advancing contact angles of water of about 100° to 105°. The reaction mixture exhibited a brown colour which indicates the presence of colloidal platinum.

Example 60 yielded a layer of ca. 100 nm thickness and an advancing contact angle of water of about 138°. The IR spectra and XPS measurements corresponded to those of polydimethylsiloxane.

Examples 61–65 yielded layers of silicone rubber strongly adhering to the substrate plates. After subjecting the sample of example 61 to vertical tension up to break, the copper film was removed from the silicon wafer while the RTV still adhered to the copper film. In absence of the coating described in this invention, no comparable adhesion was observed.

Examples 66–67 resulted in gluing the two plates. Adhesion strengths up to 8 $N/mm^2$ were measured with lap-shear tests according to DIN 53 283. A cohesive failure was observed. Hence, the use of silicon rubbers or other substances with better mechanical properties will result in higher adhesive strengths. Substrate plates without the coating described in this invention could not be glued together.

Example 68 yielded a layer with an advancing contact angle of water of about 105°. The layer thus obtained was then structured with a laser beam. The structured surface was then used as a printing plate for water-less planographs which resulted in prints with good resolution. In absence of the coating described in this invention, no structured surface and, therefore, no prints were obtained.

Examples 69–71 yielded layers with advancing contact angles of water of about 110° to 115°. The IR spectra corresponded to those of poly-dimethylsiloxane.

Example 72 yielded a layer of ca. 4 nm thickness and an advancing contact angle of water of about 112°0. The IR spectra and XPS measurements corresponded to those of polydimethylsiloxane.

Example 73–76 yielded layers with advancing contact angles of water of about 113° to 133°.

Example 77 yielded a layer with advancing contact angles of water of about 110°.

Examples 78–79 yielded layers with advancing contact angles of water of about 125° to 135°.

Examples 80–81 yielded layers with advancing contact angles of water of about 110° to 125°.

All obtained results showed that both, the presence of reagent comprising Si—H, Sn—H, or Ge—H as well as the presence of an activator is necessary for the coating. Further, it turned out that the exact composition of the coating can be influenced by the presence of additional substances.

The examples were performed in toluene and at room temperature. Thereby comparable conditions should be ensured. However, the procedure according to this invention can also be performed in other solvents, without solvent in bulk, and/or at other temperatures.

A part of the examples was performed in solvents with UV quality in order to avoid problems with the characterization of the coatings by impurities in the solvent. However, the procedure according to this invention can also be performed in technical solvents of lower purity.

A part of the examples was performed on surfaces that were prepared on discs by thermal evaporation in order to ensure an indisputable characterization of the coating. However, the procedure according to this invention can also be performed on other surfaces.

The selected concentrations and times should enable comparable conditions. However, the procedure according to this invention can also be performed with other concentrations and/or other times.

A part of the examples shows that the coatings were prepared by immersion. However, the coatings can also be obtained by other methods, such as painting or spraying.

What is claimed is:

1. A process for coating a metal surface, metal-oxide surface, metal-salt surface, silicon-comprising surface or high-molecular-weight aquoxide-comprising organic surface, comprising the steps of:

applying a reagent comprising a reactive group being selected from Si—H, Sn—H and a Ge—H, in the presence of a platinum metal, as a compound or in metallic form, that acts as an activator, and the said reagent is used in the liquid, pasty or solid form, on the surface to be coated; and effecting a reaction between the surface to be coated and the reagent.

2. The process according to claim 1 wherein the surface coated is a silicon oxide-comprising surface, a surface of a silicon wafer, a surface of an inorganic glass, a ceramic surface, a rock surface, a surface of an artificial stone, a surface of a cellulosic or a cellulose derivative-containing material, a wood surface, a surface of a proteinous material or a surface containing a natural oxide layer.

3. The process according to claim 1 wherein the platinum metal is in the form of a platinum compound, a platinum compound that is reduced with silanes to platinum(O) or that already contains platinum(O), cis-dichlorobis (styrene)-platinum (II) or platinum(O)divinyltetramethyldisiloxane as activator.

4. The process according to claim 1 wherein the reagent is a low-molecular-weight compound.

5. The process according to claim 1 wherein the reagent is a high-molecular-weight compound.

6. The process according to claim 1 wherein the reagent is a silane, a polysilazane, a polyhydrosiloxane or a polysiloxane that comprises a Si—H group.

7. The process according to claim 1 wherein the reagent is a copolymer.

8. The process according to claim 1 wherein the reagent has additional reactive groups for a post-coating reaction.

9. A process according to claim 1, further comprising the decomposition of the coating on the surface.

10. A process according to claim 1 wherein the coating applied to the surface to be coated is an adhesive, gluing, adhesion-promotion, lubrication, grease, protective, bicompatibility, anti-adhesive and/or anti-graffiti layer or a coating for printing plates or foils.

11. A part of a metal surface, metal-oxide surface, metal-salt surface, silicon-comprising surface and/or high-molecular-weight aquoxide-comprising organic surface that has been coated in accordance with the process according to claim 1.

* * * * *